United States Patent [19]

Zloch et al.

[11] Patent Number: 4,738,548
[45] Date of Patent: Apr. 19, 1988

[54] EXHAUST GAS TURBOCHARGER

[75] Inventors: Norbert Zloch, Darmstadt; Arno Förster, Worms; Uwe Münkel, Frankenthal, all of Fed. Rep. of Germany

[73] Assignee: Aktiengesellschaft Kuehnle, Kopp & Kausch, Frankenthal, Fed. Rep. of Germany

[21] Appl. No.: 1,909

[22] Filed: Jan. 9, 1987

[30] Foreign Application Priority Data

Jan. 16, 1986 [DE] Fed. Rep. of Germany ....... 3601082

[51] Int. Cl.⁴ .................. F16C 27/02; F16C 17/18; F04B 17/00
[52] U.S. Cl. ...................................... 384/99; 384/100; 384/287; 384/901; 417/407
[58] Field of Search .............. 384/99, 100, 114, 119, 384/120, 269, 276, 286, 287, 295, 428, 438, 901; 417/407

[56] References Cited

U.S. PATENT DOCUMENTS

| | | | |
|---|---|---|---|
| 3,395,949 | 8/1968 | Kun | 384/119 |
| 3,448,632 | 6/1969 | Rumbarger | 384/100 X |
| 3,811,741 | 5/1974 | McInerney et al. | |
| 4,025,134 | 5/1977 | Reisacher | 384/120 |
| 4,256,441 | 3/1981 | Arora | 384/276 X |
| 4,560,325 | 12/1985 | Yoshioka | 384/901 X |
| 4,613,288 | 9/1986 | McInerney | 384/901 X |

FOREIGN PATENT DOCUMENTS

| | | |
|---|---|---|
| 718715 | 9/1965 | Canada . |
| 7337624 | 1/1974 | Fed. Rep. of Germany . |
| 211645 | 9/1907 | Fed. Rep. of Germany . |
| 1400440 | 4/1969 | Fed. Rep. of Germany . |
| 2403768 | 8/1975 | Fed. Rep. of Germany . |
| 908567 | 10/1962 | United Kingdom . |

Primary Examiner—John Petrakes
Assistant Examiner—Thomas R. Hannon
Attorney, Agent, or Firm—Schwartz, Jeffery, Schwaab, Mack, Blumenthal & Evans

[57] ABSTRACT

An exhaust gas turbocharger comprising a bearing sleeve (26) for radially bearingly mounting a shaft (14), which sleeve is arranged in a bore (36) of a bearing housing (6) and is secured against rotation. The sleeve (26) has an inner bearing surface (34) and an outer jacket surface (32) at each of its two axial end regions, whereby lubricant present in the gap between the sleeve (26) and the bore (36) achieves a damping effect. With a thin shaft and at high rotational speeds, the exhaust gas turbocharger should have a high degree of functional reliability. It is proposed that the sleeve (26) be subdivided into two axially spaced bearing bushings (20, 22) which are connected to each other by small and substantially rigidly formed bridges (24). The securing devices comprise a rod (46) which lies in contact with one of the bridges (24) and serves only to prevent rotation of the sleeve (26) which otherwise can carry out free floating movements.

20 Claims, 2 Drawing Sheets

EXHAUST GAS TURBOCHARGER

BACKGROUND OF THE INVENTION

This invention relates to an exhaust gas turbocharger with a sleeve arranged in a bore in a bearing housing for radially bearingly mounting a shaft, wherein the sleeve has an inner bearing surface and an outer jacket surface at each of its two axial end regions, and with means arranged in the bearing housing which secure the sleeve against rotation in the bore of the bearing housing, whereby lubricant present in a gap between the sleeve and the bore exerts a damping effect.

Canadian Pat. No. 718,715 discloses an exhaust gas turbocharger having a sleeve provided at one axial end with teeth and slits. A pressure plate connected to the bearing housing so that it cannot rotate is provided with corresponding slits and teeth in which those of the sleeve engage. Means constructed in this manner prevent not only the rotation of the sleeve around the axis of rotation of the shaft, other degrees of freedom are also significantly limited. In particular, the two other rotational degrees of freedom around the spatial axes perpendicular to the longitudinal axis are practically eliminated. The translational degrees of freedom are also significantly limited since a surface pressure arises on the contact surfaces of the teeth of the sleeve and the pressure plate. A free floating arrangement of this known sleeve is not achieved in the required manner. The sleeve contains two small bores in the center for the lubricant and in addition has a comparative large mass. With this known exhaust gas turbocharger, rotational speeds of up to about 80,000 rpm can be achieved.

Further, West German Utility Model DE-GM No. 73 37 624 discloses an exhaust gas turbocharger with two axially spaced bearing bushings. In the center between the bearing bushings, there is a third bushing which is pressed in the bearing housing. The bearing bushings are connected by means of elastic elements to the central bushing so that they can execute small oscillating movements independently of each other. In order to damp these oscillations, the oil under pressure which serves for lubrication is used. A free floating bearing is not achieved hereby, especially because the bearing bushings serve not only for radial mounting, but also for axial mounting of the shaft. Further, the bearing bushings move within predetermined limits independently of each other.

In rapidly rotating rotors an effect referred to as "oil whip" can occur, which can arise in rotational speed ranges greater than twice the value of the first or second critical speed of rotation. This effect produces a stimulation of the shaft in the sense that the shaft ends carry out a second rotational movement around the geometric axis superimposed on the rotation of the shaft. The part of the shaft which is located between the two axially spaced bearing surfaces is directed outwardly in the opposite direction, and one therefore speaks of the so-called "rope knock" effect. If the superimposed rotational movement occurs at half of the speed of rotation of the shaft, a metallic contact between the shaft and the bearing bushing can arise, from which a complete loss of the bearing capacity and destruction of the bearing may result. The deformation of the shaft which arises can lead to an unacceptable edge pressure at the ends of the bearing bushings. Freely floating bearing bushings which freely rotate with the shaft at about half the speed of rotation of the shaft can each make slight radial movements and tipping movements independently of each other. In small exhaust gas turbochargers which rotate at very high rotational speeds, e.g., at speeds in excess of 150,000 rpm, the known measures are not sufficient to make possible a functionally reliable bearing. Exhaust gas turbochargers of this type have very small rotating masses with minimal shaft diameters, whereby the imbalance load resulting from the deformation of the shaft can amount to up to one hundred times the value of the mass of the rotor. Such a bending of the shaft, i.e., the "rope knock" effect which then arises, can become unacceptably large, whereby not only the aforementioned mechanical damage occurs, but also a strong generation of noise can arise.

SUMMARY OF THE INVENTION

The invention is therefore based on the object of providing an exhaust gas turbocharger, particularly for high rotational speeds and having small dimensions, which assures good rotor stability with high functional reliability and a long service life. The exhaust gas turbocharger should be capable of being provided with an extremely thin or bendable shaft, and frictional losses should be kept small. Also with small rotating masses, particularly of the turbine wheel, of the thin shaft as well as of the compressor wheel, stable rotor dynamics and quiet operation should further be assured. The exhaust gas turbocharger should operate in a functionally reliable manner and with a long service life at high rotational speeds above 150,000 rpm, and particularly up to at least 200,000 rpm.

To achieve this object it is proposed that the sleeve be subdivided into two axially spaced bearing bushings with bearing surfaces, that the two bearing bushings be connected with each other by means of small, substantially rigid bridges, and that the securing means comprise a rod which is connected with the bearing housing and which contacts one of the bridges.

Thus, the objects of the invention are achieved by providing an exhaust gas turbocharger comprising a sleeve arranged in a bearing housing for radially bearingly mounting a shaft, said sleeve having in the vicinity of each of its two axial ends an inner bearing surface and an outer jacket surface, and securing means arranged in said bearing housing by means of which said sleeve is secured against rotation in a bore of said bearing housing; whereby lubricant present in a gap between said sleeve and said bore achieves a damping effect; wherein said sleeve is subdivided into two axially spaced bearing bushings each comprising one of the inner bearing surfaces; wherein said two bearing bushings are connected with each other by means of two small rigid bridges; and wherein said securing means comprise a securing rod which engages one of said bridges.

The exhaust gas turbocharger according to the invention is distinguished by a high degree of functional reliability with a simple construction, whereby even at high rotational speeds greater than 150,000 rpm, bearing damage or disturbing noises can be reliably prevented. The shaft may, in view of the low bearing friction losses, have an extremely small diameter, and stable operation is achieved without the disadvantages listed above. The bridges arranged to directly connect the two bearing bushings are nonelastic, and consequently a rigid construction is provided which in its totality can float freely and can move in all directions, with the exception of rotation about the longitudinal axis. Because of the small bridges the two bearing bushings maintain their geometric relationship to each other. Because of the openings a significant reduction of the total mass of the sleeve is achieved. This is of particular significance with respect to the oscillation behavior at high speeds of rotation. The openings are formed as elongated slots, the width of which in the circumferential direction is substantially greater than the width of the small bridges. The bridges which extend in the axial direction are formed with a substantially uniform width over their entire length. The comparatively small length of the inner bearing surface parallel to the axis contributes to reduction of the friction, while the outer jacket surface, which in accordance with the invention has a greater length than the bearing surface, produces a larger pressurized oil film, whereby good damping is achieved in a reliable manner. The direct connection of the two bearing bushings by means of bridges and the openings disposed between them assure an unimpeded discharge of the lubricant or oil. The small bridges according to the invention and the substantially larger openings prevent congestion or clogging of the lubricant which exits toward the center from the bearing gaps. A disadvantageous breaking action due to congestion or damming up of the lubricant is thus avoided. The sleeve or the two bearing bushings do not serve to receive axial loads and thus function exclusively as radial bearings, since otherwise the receipt of axial forces would hinder the free movability or free floating of the sleeve. An axial bearing, not described here in further detail, is additionally provided for the shaft. The securing means provided according to the invention serve exclusively to fix the sleeve in the direction of rotation of the shaft. According to this invention, the securing rod engages one of the connecting bridges substantially at a single point. Only the one rotational degree of freedom is eliminated by the aforesaid securing means, while the remaining degrees of freedom are present for the free floating sleeve in accordance with the predetermined play between the assembled parts. The securing means do not limit the axial movability of the sleeve. The sleeve is prevented from rotating around the axis of rotation without otherwise impairing the free movability or the possibility of free floating, whereby, naturally, the limitations corresponding to the loose construction in the bearing housing remain in effect. Taking into account the fact that the rotor weight is very light in comparison to the imbalance loading of the shaft, whereby the "rope knock" potential is correspondingly large, the spacing of the two bearing bushings or bearing surfaces is relatively small.

One particular embodiment is characterized in that the ratio of the length of the inner bearing surface parallel to the axis to the length of the outer jacket surface is from 0.25-0.5 to 1. An optimum dimensional relationship is hereby achieved in such a way that, on the one hand, an extremely low bearing friction occurs in the region of the inner bearing surface, and on the other hand, because of the comparatively large jacket surface, outstanding stability is assured due to the damping effect of pressurized oil between the jacket surface and the bore in which the sleeve is mounted.

A further advantageous embodiment is characterized in that the length of each of the inner bearing surfaces of the two bearing bushings parallel to the axis is related to the inner diameter of the bushings as 0.3-0.5 to 1. Through this arrangement, which is important particularly in view of the extremely thin shaft diameter, bearing friction losses are minimized.

In another advantageous embodiment the sleeve is secured at its two axial ends against axial displacement by means of securing elements with some axial play, in particular securing rings. Simple and economical fabrication and, further, free movability of the sleeve are thereby assured. According to this invention the axial thrust is taken up exclusively by a separate axial bearing. The securing rings simultaneously also serve as flow restriction or throttle elements. A high pressure can thus build up in the gap between the jacket surface and the bore of the bearing housing, which pressure is of special importance in view of the damping effect of the pressurized oil. For the same reason the ends of the jacket surfaces facing toward the center are also formed as flow restriction or throttle points. This may be advantageously achieved by allowing the ridges to remain which arise during production of the openings or during formation of the bridges.

In a further embodiment the sleeve is arranged in the bearing housing in such a way that the bridges lie substantially in a horizontal plane and the openings are directed vertically upwardly or downwardly. In accordance with the invention, the bridges are formed relatively small and are arranged laterally of the shaft. An orderly free outflow of oil is assured through the downwardly directed openings. Because of the symmetrical construction of the sleeve with two lateral bridges, assembly errors can be prevented. In the sleeve according to the invention, the axial length of the bridges is substantially equal in size to the axial length of the jacket surface of each of the individual bearing bushings.

BRIEF DESCRIPTION OF THE DRAWINGS

The invention will be explained hereinafter in further detail with reference to a preferred working embodiment illustrated in the accompanying drawings in which.

DETAILED DESCRIPTION OF PREFERRED EMBODIMENTS

Figure 1:
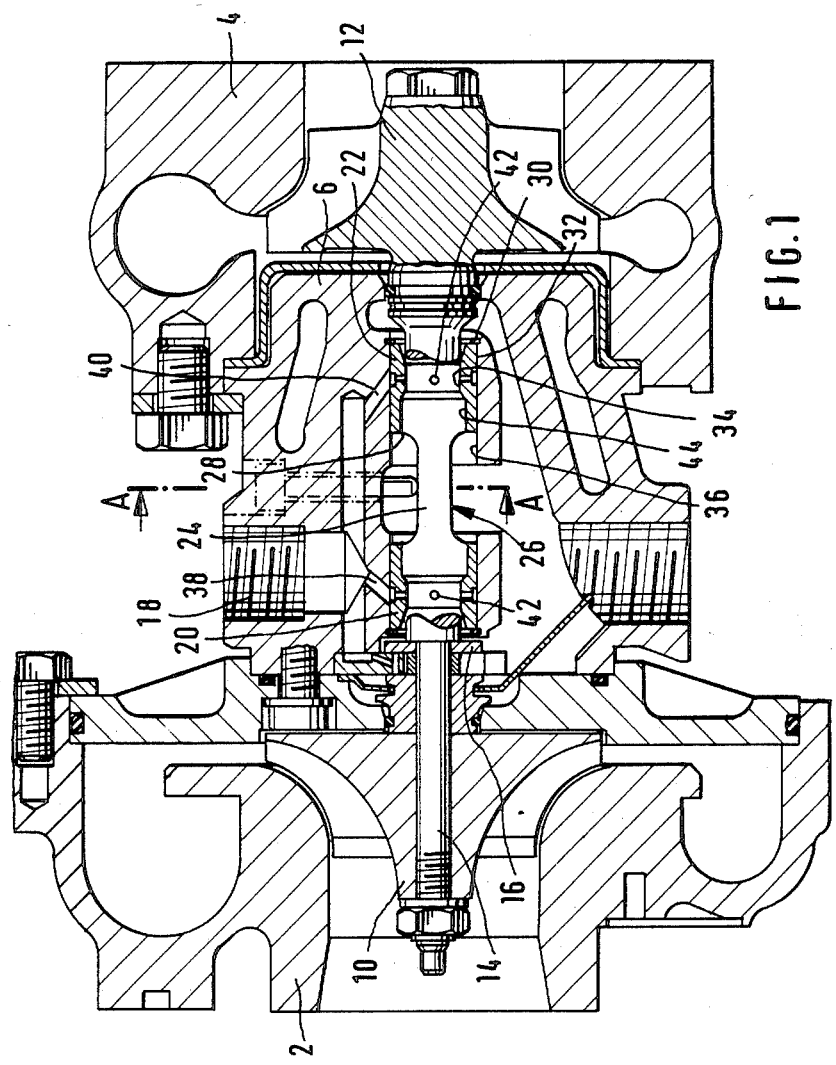
FIG. 1 shows a longitudinal axial section through an exhaust gas turbocharger according to the invention.

In FIG. 1 a compressor housing 2 is shown at the left, and a turbine housing 4 is shown at the right, which are connected to each other in a known manner through a bearing housing 6. The compressor wheel 10 and similarly the turbine wheel 12 are arranged on and rotationally attached to a shaft 14. An axial bearing 16 serves for axial mounting in bearing housing 6. Pressurized oil, particularly from a motor, is supplied to the bearing housing 6 through a bore 18 in order to lubricate and cool the bearing in the usual manner.

The shaft 14 has a relatively small diameter and is radially mounted in an inner bore of the bearing housing 6 by means of two axially spaced bearing bushings 20 and 22. The two bearing bushings 20 and 22 are integrated with each other into a sleeve 26 by means of two axially extending small bridges 24. In this drawing only one of the bridges 24, which lies behind the plane of the drawing, can be seen. A further bridge is correspondingly provided in front of the plane of the drawing. The sleeve 26 thus has an opening 28 formed as an elongated slot in each case between the two bridges 24. The two bridges 24 are arranged substantially in a radial plane in each case at the sides of the shaft 14, and the lubricant can flow unhindered out through the opening 28 located vertically under the bridges. Jamming or clogging of oil in the central region of the sleeve and losses resulting therefrom are thereby avoided.

Further, in accordance with the invention, the two bridges 24 have approximately the same length in the axial direction as the outer jacket surfaces 32 of the two bearing bushings 20 and 22 which are described hereinafter. The sleeve 26 is axially secured by means of securing rings 30. The significant thing is that the axial mounting is effected exclusively by means of the axial bearing 16, whereby the sleeve 26 is arranged in the bearing housing 6 so that it has some axial play between the securing rings 30. The overall mass of the sleeve is minimized by the openings 28 formed in accordance with the invention as elongated slots extending in the axial direction, and free movability of the sleeve is achieved with substantially reduced mass forces.

Figure 2:
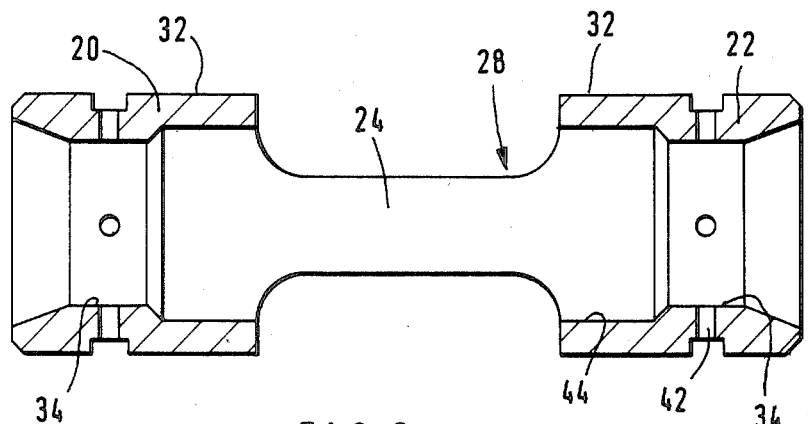
FIG. 2 shows an enlarged view of the sleeve with the two bearing bushings.

As can be seen from the enlarged illustration of FIG. 2, the outer jacket surface 32 has a greater axial length than the inner bearing surface 34. Between the inner surface 36 of the bore of the bearing housing 6 and the jacket surface 32 there is a pressurized oil gap which accordingly has a substantially larger surface and axial length than the inner bearing surface. In accordance with the invention, a larger pressurized oil film is formed, and a reliable damping is achieved because of this large pressurized oil gap. According to this invention, pressurized oil supply bores 38 and 40 are provided which each lead to one of the pressurized oil gaps around the bearing bushings. The securing rings 30 arranged at the two axial end faces of the bearing bushings 20 and 22, i.e. of the sleeve 26, for securing the sleeve simultaneously also serve as flow restriction or throttle elements for the pressurized oil gap, so that a reliable build-up of pressure is assured. The inner ends of the jacket surfaces are also formed as flow restriction or throttle points. This is simply achieved in accordance with the invention in that the ridges which are created during the production of the bridges 24 and which project very slightly radially outwardly beyond the jacket surface, are allowed to remain. The two bearing bushings each have an outer circumferential groove with four radial bores 42 distributed uniformly around the circumference through which the pressurized oil passes to the inner bearing surfaces 34. In accordance with the invention, extensions 44 with enlarged diameters axially adjoin the inner bearing surfaces 34 toward the axial center of the sleeve. These extensions transition continuously into the bridges 24, which likewise have a corresponding radial spacing with respect to the shaft 14. The two extensions 44 have an axial length of the same order in size as the length of the bearing surfaces. The inner bearing surface is thus substantially smaller than the outer jacket surface, and the frictional losses can consequently be kept small.

Figure 3:
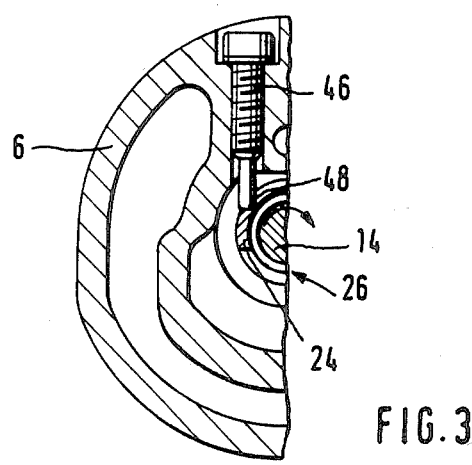
FIG. 3 shows an sectional view taken along section line A—A of FIG. 1.

FIG. 3 shows the means for fixing, i.e. for preventing rotation of, the sleeve 26. In this drawing, one bridge 24 from the sleeve 26 can be seen. In the bearing housing 6 there is a securing rod 46, the end of which lies in contact with a side surface 48 of the bridge 24. A substantially point-like contact is created so that the movability of the sleeve 26 is not otherwise impaired. Only rotation of the sleeve about its longitudinal axis is prevented by the securing rod 46. In accordance with the invention, the rod 46 engages the bridge substantially in the middle between the two bearing bushings 20 and 22. The sleeve 26 is otherwise arranged to float freely in accordance with the play between the jacket surface and the bearing housing on the one hand as well as between the inner bearing surface 34 and the shaft 14 on the other hand, and further in accordance with the axial play with regard to the securing rings. No fixing in the axial direction occurs by means of the securing rod 46. It is further significant that the securing rod 46 is not arranged in a radial direction, but instead is arranged parallel to a radial plane or substantially tangentially to the bridge. Contact is thereby avoided between the shaft and a securing rod which due to production tolerances may have been screwed in too far. The bridges 24, which extend in the axial direction, are constructed relatively small and nevertheless assure a rigid connection between the two axially spaced bearing bushings. The two bridges 24 in accordance with the invention are produced at a low production cost by removing the material originally present in the regions of the openings 28.

The foregoing description has been set forth merely to illustrate the invention and is not intended to be limiting. Since modifications of the described embodiments incorporating the spirit and substance of the invention may occur to persons skilled in the art, the scope of the invention should be limited solely with reference to the appended claims and equivalents.

What is claimed is:

1. An exhaust gas turbocharger comprising:
   a sleeve arranged in a bearing housing for radially bearingly mounting a shaft, said sleeve having in the vicinity of each of its two axial ends an inner bearing surface and an outer jacket surface; and
   securing means arranged in said bearing housing by means of which said sleeve is secured against rotation in a bore of said bearing housing;
   whereby lubricant present in a gap between said sleeve and said bore achieves a damping effect;
   wherein said sleeve is subdivided into two axially spaced bearing bushings each comprising one of the inner bearing surfaces;
   wherein said two bearing bushings are connected with each other by means of two small rigid bridges; and
   wherein said securing means comprise a securing rod which engages one of said bridges.

2. An exhaust gas turbocharger according to claim 1, wherein said bridges are arranged in a substantially axial direction and have a substantially uniform width over their entire length.

3. An exhaust gas turbocharger according to claim 1, wherein openings are provided in the sleeve between said bridges, said openings having the form of elongated slots which extend in the circumferential direction over a greater angular width than said bridges.

4. An exhaust gas turbocharger according to claim 1, wherein the length of said inner bearing surfaces in a direction parallel to the axis of said sleeve is related to the length of the outer jacket surface as 0.25–0.5 to 1.

5. An exhaust gas turbocharger according to claim 1, wherein the length of said inner bearing surfaces in a direction parallel to the axis of said sleeve is related to the inner diameter of the bearing bushings as 0.3–0.5 to 1.

6. An exhaust gas turbocharger according to claim 1, wherein said bridges each extend across a substantially smaller circumferential region than is covered by openings between the bridges.

7. An exhaust gas turbocharger according to claim 1, wherein said bridges are substantially equal in length in the axial direction to the axial length of one of the jacket surfaces.

8. An exhaust gas turbocharger according to claim 1, wherein an axial extension toward the middle of the sleeve adjoins each of the inner bearing surfaces and joins it to the bridges.

9. An exhaust gas turbocharger according to claim 8, wherein said axial extensions each have substantially the same axial length as the individual bearing surfaces.

10. An exhaust gas turbocharger according to claim 1, wherein said sleeve is secured with play against axial displacement by means of securing elements at both of its axial ends.

11. An exhaust gas turbocharger according to claim 10, wherein said securing elements are securing rings.

12. An exhaust gas turbocharger according to claim 10, wherein said securing elements simultaneously serve as throttle elements for lubricant flowing between said jacket surfaces and the bore of the bearing housing in which the bearing bushings are received.

13. An exhaust gas turbocharger according to claim 1, wherein the ends of said jacket surfaces disposed toward the axial center of the sleeve are formed as throttle points for lubricant flowing between said jacket surfaces and the bore of the bearing housing in which the bearing bushings are received.

14. An exhaust gas turbocharger according to claim 1, wherein the ends of said bearing surfaces disposed toward the axial center of the sleeve are formed as throttle points for lubricant.

15. An exhaust gas turbocharger according to claim 1, wherein each bearing bushing is provided with a separate lubricant supply channel in said bearing housing, and each bearing bushing has a circumferential groove for distributing lubricant therearound.

16. An exhaust gas turbocharger according to claim 15, wherein said lubricant supply channels are bores in the bearing housing, and lubricant is supplied to each inner bearing surface through four radial supply bores.

17. An exhaust gas turbocharger according to claim 1, wherein said sleeve is arranged in the bearing housing in such a way that said bridges lie at the sides of the shaft substantially in a horizontal plane, and openings between the bridges are disposed at the top and at the bottom of the sleeve.

18. An exhaust gas turbocharger according to claim 1, wherein said securing rod is screwed into said bearing housing to secure the rod in desired position, and an end of said securing rod contacts a side surface of one of said bridges.

19. An exhaust gas turbocharger according to claim 1, wherein said securing rod is arranged substantially parallel to a vertical radial plane and spaced a predetermined distance laterally of said vertical radial panel.

20. An exhaust gas turbocharger according to claim 1, wherein said securing rod contacts said bridge substantially at the axial center of said sleeve.

* * * * *